United States Patent
Biltresse et al.

(10) Patent No.: US 9,074,079 B2
(45) Date of Patent: Jul. 7, 2015

(54) STARCH-BASED COMPOSITIONS FOR LATEX REPLACEMENT

(75) Inventors: Stephane Biltresse, Etterbeek (BE); Massimo Bregola, Castelmassa (IT); Maurice Timmermans, AH Oosterhout (NL)

(73) Assignee: CARGILL, INCORPORATED, Wayzata, MN (US)

( * ) Notice: Subject to any disclaimer, the term of this patent is extended or adjusted under 35 U.S.C. 154(b) by 139 days.

(21) Appl. No.: 13/704,394

(22) PCT Filed: Jun. 15, 2011

(86) PCT No.: PCT/EP2011/002938
§ 371 (c)(1),
(2), (4) Date: Dec. 14, 2012

(87) PCT Pub. No.: WO2012/000609
PCT Pub. Date: Jan. 5, 2012

(65) Prior Publication Data
US 2013/0096239 A1    Apr. 18, 2013

(30) Foreign Application Priority Data

Jun. 16, 2010 (EP) .................................. 10006215
Oct. 27, 2010 (EP) .................................. 10075720

(51) Int. Cl.
| | |
|---|---|
| *C08L 3/00* | (2006.01) |
| *C08L 3/02* | (2006.01) |
| *C08L 3/04* | (2006.01) |
| *C08B 30/14* | (2006.01) |
| *C08B 31/00* | (2006.01) |
| *C08B 31/04* | (2006.01) |
| *C08F 251/00* | (2006.01) |
| *C08G 73/02* | (2006.01) |
| *C09J 103/04* | (2006.01) |
| *C09J 113/02* | (2006.01) |
| *C09J 121/02* | (2006.01) |
| *D06N 7/00* | (2006.01) |
| *C08K 3/26* | (2006.01) |
| *C08L 21/02* | (2006.01) |
| *C08L 51/02* | (2006.01) |
| *C08L 79/02* | (2006.01) |

(52) U.S. Cl.
CPC . *C08L 3/04* (2013.01); *C08B 30/14* (2013.01); *C08B 31/006* (2013.01); *C08B 31/04* (2013.01); *C08F 251/00* (2013.01); *C08G 73/022* (2013.01); *C08K 3/26* (2013.01); *C08L 21/02* (2013.01); *C08L 51/02* (2013.01); *C08L 79/02* (2013.01); *C09J 103/04* (2013.01); *C09J 113/02* (2013.01); *C09J 121/02* (2013.01); *D06N 7/0071* (2013.01); *D06N 7/0073* (2013.01); *D06N 2203/028* (2013.01)

(58) Field of Classification Search
CPC ......................................................... C08L 3/04
USPC ........................................................... 524/47
See application file for complete search history.

(56) References Cited

U.S. PATENT DOCUMENTS

| | | | |
|---|---|---|---|
| 3,071,573 A | 1/1963 | Taylor | |
| 3,632,535 A * | 1/1972 | Gramera et al. | 524/734 |
| 4,279,791 A | 7/1981 | Speakman | |
| 5,147,907 A | 9/1992 | Rinck et al. | |
| 5,358,998 A | 10/1994 | Wendel et al. | |
| 5,925,722 A | 7/1999 | Exner et al. | |
| 6,800,675 B1 | 10/2004 | Pfalz et al. | |
| 2010/0018660 A1 | 1/2010 | Varnell | |
| 2011/0118168 A1 * | 5/2011 | Schunicht et al. | 510/400 |

FOREIGN PATENT DOCUMENTS

| | | | |
|---|---|---|---|
| EP | 02787970 | | 10/1988 |
| EP | 0405917 | * | 1/1991 |
| EP | 0552876 | | 7/1993 |
| GB | 931681 | | 7/1963 |
| GB | 932389 | * | 7/1963 |
| GB | 1568688 | | 6/1980 |
| WO | WO 0012746 A1 | * | 3/2000 |
| WO | 2008150647 | | 12/2008 |
| WO | 2009153447 | | 12/2009 |
| WO | 2009156067 | | 12/2009 |

OTHER PUBLICATIONS

International Search Report of PCT/EP2011/002938 filed Jun. 15, 2011, mailed Oct. 30, 2011.

* cited by examiner

*Primary Examiner* — Hui Chin

(57) ABSTRACT

A method for producing starch-based compositions, and the composition produced therewith, for use as latex substitutes for full or partial latex replacement in applications such as carpet backing.

18 Claims, 1 Drawing Sheet

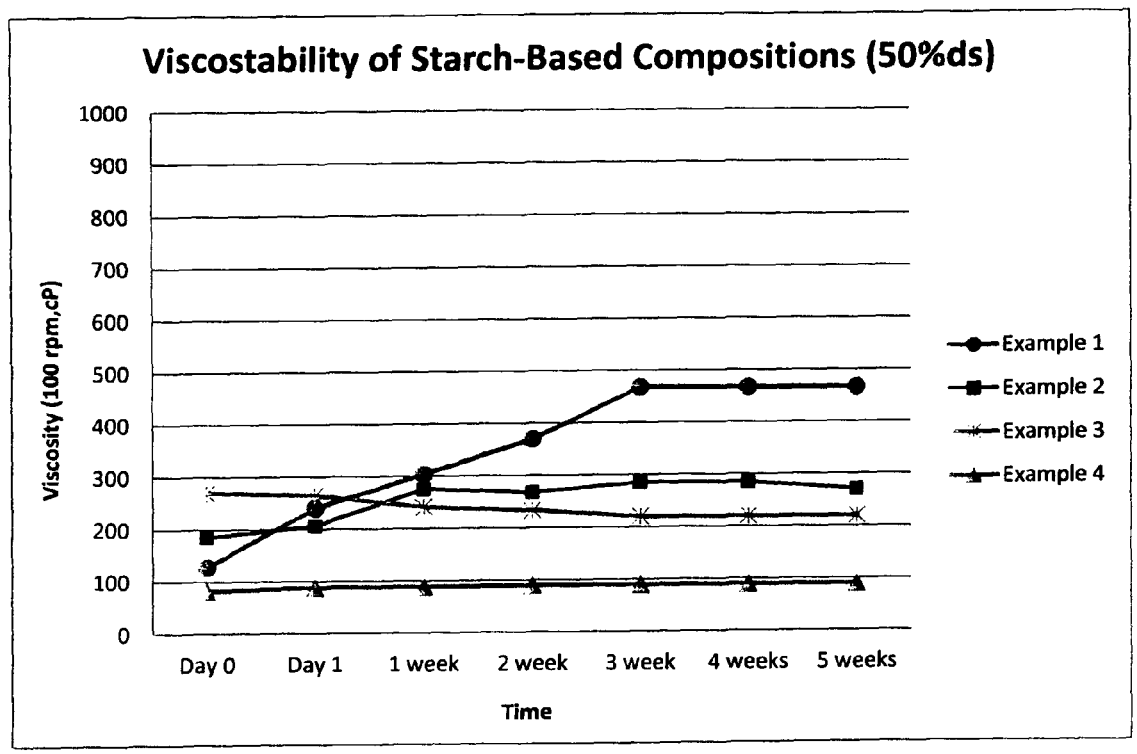

US 9,074,079 B2

STARCH-BASED COMPOSITIONS FOR LATEX REPLACEMENT

CROSS-REFERENCE TO RELATED APPLICATIONS

This application is a national phase application of international application PCT/EP11/002938, filed Jun. 15, 2011, which application claims priority to European Application 10006215.7, filed Jun. 16, 2010, and to European Application 10075720.2, filed Oct. 27, 2010, which applications are hereby incorporated by reference herein in their entirety.

FIELD OF THE INVENTION

The present invention relates to starch-based compositions, processes for their preparation and uses thereof to replace latex in applications such as carpet-backing, sizing and coating compositions and adhesive formulations.

BACKGROUND OF THE INVENTION

There is a long recognised need in the art to replace synthetic materials and, in particular, synthetic binders, with more environmentally friendly, natural alternatives. Starch has often been proposed as a "green" alternative to polymers such as latex. However, starch is very different from a latex polymer. When solubilised in water, starch forms a colloidal solution. By contrast, synthetic latex polymers are used in the form of water emulsions. As such, no-one has yet been able to find an entirely satisfactory way of replacing synthetic latex polymers with starch.

U.S. Pat. No. 3,779,857, for example, describes the manufacture of carpet under-layers from a synthetic latex containing large amounts of an inorganic pigment and to which a ternary mixture of granular starch, urea and borax is added in an amount up to 40 parts by weight, based on 100 parts by weight of dry polymer present within the latex. The synthetic latex further comprises a solvent plasticizer such as petroleum oil. During the drying and curing process of the layer formed from the latex, the granular starch gelatinizes. The patent observes the need to prevent an excessively high viscosity of the starch when mixed with the aqueous synthetic latex and the filler. As such, the starch is not pre-gelatinized and is preferably modified by oxidation or acid hydrolysis.

U.S. Pat. No. 4,104,213 does suggest the use of a pre-gelatinized starch. It specifies however that the starch should not be completely gelatinized or fragmented. This partial gelatinization is achieved through the use of steam that is added periodically during a hold time sufficient to give desired volume in a swollen volume test. The starch is then milled. So, the gelatinization should be just sufficient to prevent loss of granular character, as U.S. Pat. No. 4,104,212 of the same patentee and filed on the same day admits. This patent mentions that the latex compositions comprising the starch have a viscosity that is stable during 3 days. However, a stability of 3 days would not be sufficient for a commercial product, and the limited, partial gelatinization suggests a preparation process with limited robustness. This is inherently problematic for industrialisation.

U.S. Pat. No. 4,138,518 proposes to gelatinize the starch in situ in the presence of the synthetic latex polymers in the course of drying the formulation of latex polymers and starch. It is immediately added that a starch sensitizer, including borax, is to be used to lower the gelatinization temperature. The patent further mentions that improvement of the strength and durability of a composite textile coated with latex is significantly improved, when latex containing the starch particles is heated and dried to a temperature and under conditions to cause the starch particles to swell substantially uniformly throughout the thickness of the composite. These statements of the need for lowering the gelatinization temperature and the need for choosing conditions to obtain substantially uniform swelling implies that it is not simple to obtain a product with the desired properties.

EP0670348 proposes the use of un-gelatinized starch as a filler to replace common calcium carbonate fillers in carpet backing compositions. This application admits that it is of essential importance that the latex composition has the proper water content so that the granular structure of the starch product is completely or largely retained. A swelling inhibitor such as urea is therefore very important. If the granular structure were not retained, there would be no filling effect and the carpet will have a larger vulnerability to liquids and to bacteria. Unfortunately, urea results in a reduction of overall adhesiveness of the latex composition.

There is therefore a clear need in the art for a starch-based composition which can be used to replace latex without some of the difficulties identified above and which could mirror some, if not all, of the benefits of a latex emulsion, namely being available as a ready-to-use liquid product, having a relatively low viscosity even at high dry substance, having good visco-stability and providing high wet strength when used, for instance, as a binder. The present invention provides such a composition.

SUMMARY OF THE INVENTION

According to a first aspect of the present invention, there is provided a process for the production of a starch-based composition, characterised in that it comprises the steps of:
a. providing a starch and/or starch derivative which is soluble in cold water; and/or
b. treating a starch and/or starch derivative to increase its cold water solubility;
c. reacting the starch and/or starch derivative with a stabilising agent;
d. neutralising the stabilised starch and/or starch derivative; and
e. functionalising the starch and/or starch derivative obtained in step (d).

According to a further aspect of the present invention, there is provided a starch-based composition obtainable by the above process.

According to another aspect of the present invention, there is provided the use of a composition as defined above to replace latex, fully or in part.

According to yet another aspect of the present invention, there is provided a binder composition comprising a starch-based composition of the invention and latex.

According to a further aspect of the present invention, there is provided a carpet backing composition comprising a starch-based composition or a binder composition of the invention.

According to a further possible aspect of the present invention, there is provided a carpet produced with a composition of the invention.

BRIEF DESCRIPTION OF THE FIGURES

FIG. 1 shows the visco-stability of a starch-based composition prepared in accordance with the present invention.

DETAILED DESCRIPTION OF THE INVENTION

The present invention relates to a process for the production of a starch-based composition comprising the steps of:

a. providing a starch and/or starch derivative which is soluble in cold water; and/or
b. treating a starch and/or starch derivative to increase its cold water solubility;
c. reacting the starch and/or starch derivative with a stabilising agent;
d. neutralising the stabilised starch and/or starch derivative; and
e. functionalising the starch and/or starch derivative obtained in step (d).

The term "starch-based composition" as used herein may refer to any dry, semi-dry or aqueous composition comprising a starch and/or starch derivative as defined below together with and/or reacted with one or more other ingredients. Preferably, it will refer to an aqueous composition. It may refer both to the final composition obtainable by the process of the present invention, but also to intermediate compositions obtainable at various stages of the process.

Starch and/or Starch Derivative

The term "starch" as used herein may refer to any native or modified starches and to mixtures thereof. In particular, it may refer to starches of any origin including, by way of example only, potato starch, corn starch, wheat starch, tapioca starch, pea starch, rice starch, sorghum starch and mixtures of two or more thereof. The starches may be waxy or non-waxy. Modified starches may include starches which have been physically (e.g. by heat), chemically and/or enzymatically modified.

The term "starch derivative" will refer to products derived from starch, for example by hydrogenation or depolymerisation (e.g. glucose, dextrins or maltodextrins), and to mixtures thereof. Preferably, the starch derivative will refer to one or more dextrins and/or maltodextrins. Advantageously, it will have a DE of 0-20.

For use in the process of the present invention, the starch and/or starch derivative will need to be cold water soluble. The expression "cold water soluble" as used herein refers to the fact that the starch and/or starch derivative must be capable of forming a stable dispersion in water at room temperature (i.e. at 20-25° C.). It may be selected from starches and/or starch derivatives which are already sufficiently cold water soluble or, alternatively, it may be treated to increase its solubility as part of the present process. This may be achieved, for instance, by thermally modifying, gelatinising and/or thinning the selected starch and/or starch derivative.

The starch and/or starch derivative will preferably have a relatively low molecular weight. Ideally, it will have a molecular weight of 200 to 15,000 Daltons, preferably of 150 to 25,000 Daltons, more preferably of 100 to 50,000 Daltons—although the exact molecular weight will of course depend on the nature of the starch and/or starch derivative being used. Without wishing to be bound by theory, it is believed that the use of starches and/or starch derivatives with a relatively low molecular weight will be beneficial for the viscosity of the final composition. Additionally, it may contribute to a well-controlled gelatinization process, particularly to a thorough gelatinization in which the starch and/or starch derivative becomes fully dispersed in the aqueous composition. Gelatinisation may be achieved using any means known in the art including, for example, jet cooking, batch cooking and/or enzymatic cooking. Jet cooking may be performed for instance at 120° C., with the reaction typically continuing even after cooking has been interrupted. Preferably, cooking is carried out so as to fully gelatinize the starch and therefore enable complete dispersion of the starch and/or starch derivative in an aqueous composition.

If a thinning step is used as part of the present process, this will further reduce the molecular weight of the starch and/or starch derivative. In certain embodiments, the thinned starches and/or starch derivatives may have a chain length of less than 100 units, for example of less than 50 units or even in the range of 10 to 30 units. Depending on the desired result, a skilled person will know how to control and eventually interrupt the thinning reaction.

If the starch and/or starch derivative is selected from one or more maltodextrins, then gelatinization and/or thinning may not be necessary (and processing time, in accordance with the present invention, may be remarkably reduced). In fact, maltodextrins can be used directly in the process of the present invention in the form of syrups, including unrefined syrups, as recovered from the starch refining process. Preferably, such maltodextrin syrups can be used at the temperature they are recovered from the refining process (e.g. about 50 to 100° C.).

Preferably, the starch and/or starch derivative will be provided in the form of an aqueous composition. Preferably, the aqueous composition will be in the form of a slurry comprising 30 to 50%, more preferably 35 to 45% starch and/or starch derivative by weight.

Whether or not the starch and/or starch derivative is provided in the form of an aqueous composition, the medium within which the starch and/or starch derivatives are brought into contact with the one or more agents or reagents described herein will be referred to as the reaction medium. Preferably, the reaction medium will be an aqueous reaction medium.

Stabilising Agent

The term "stabilising agent" as used herein will refer to any composition capable of imparting stability to the starch and/or starch derivative. In particular, it will be capable of imparting visco-stability to the starch and/or starch derivative (i.e. a stable viscosity over time when kept under normal storage conditions). Preferably, the term "stabilising agent" will refer to a cross-linking agent. More preferably, the stabilising agent will be selected from the group consisting of: unsaturated organic compounds with two or more hydrophilic polar groups, precursors thereof, oligomers based on the unsaturated organic compound and mixtures of two or more thereof. The hydrophilic polar groups may be acids or anions, such as carboxylic acid or carboxylate, sulfate anions, phosphate anions, or acrylates, sulfoacrylates and the like. The use of compounds with different hydrophilic groups is not excluded. The hydrophilicity of the available hydrophilic polar groups should be sufficiently strong to outweigh any hydrophobic character of the unsaturated organic compound. According to a particularly preferred embodiment of the invention, the stabilising agent will be selected from the group consisting of: unsaturated carboxylic acid or a precursor thereof such as itaconic acid (2-methylidenebutanedioic acid), itaconic acid anhydride, maleic acid (ethane-1,2-dicarboxylic acid), maleic acid anhydride, fumaric acid and mixtures of two or more thereof. Most preferably, the stabilising agent will be a dicarboxylic acid.

The stabilising agent will advantageously be used, in accordance with the present invention, in an amount of 0.5 to 10% by weight, preferably of 3 to 7% by weight, more preferably of about 5%, based on total dry weight of the starch and/or starch derivative. Stabilisation will advantageously result in starch and/or starch derivatives having an average of up to 500 repetitive units, preferably from 5 to 200, more preferably from 10 to 100 units.

Where the starch and/or starch derivative is to be solubilised as part of the present process, stabilisation (i.e. reaction of the starch and/or starch derivative with the stabilising agent) may occur simultaneously or subsequently to the solubilisation step. In fact, according to certain embodiments, the addition of the stabilising agent may results in an acidification of the reaction medium which in turn may lead to hydrolysis—and therefore solubilisation—of the starch and/or starch derivative. For reasons of control, the pH of the reaction medium may be adjusted to a predefined value using, for example, a diluted acid (e.g. diluted hydrochloric acid or diluted sulphuric acid) and/or a base (such as sodium hydroxide). The reaction medium, during steps (b) and/or (c), will preferably have a pH in the range of 1 to 4, more preferably of 1 to 2.5, more preferably of 1.5 to 2 such as, for instance, a pH of 1.5, 1.8 or 2.

Initiator

Stabilisation of the starch and/or starch derivative can be promoted by the use of an initiator or catalyst (referred to jointly as "initiator" herein). Initiators will be understood to include any compounds suitable for enabling interactions between the starch and/or starch derivative and the stabilising agent. Initiators may include persulfate compounds such as sodium persulfate, ammonium persulfate, potassium persulfate and the like; per-phosphate compounds such as sodium, ammonium, potassium and the like; peroxide compounds such as tertiary butyl hydro-peroxide, hydrogen peroxide and the like; and mixtures of two or more thereof.

The use of persulfate and/or peroxide compounds will be particularly beneficial, as they may also lead to oxidation of the starch and/or starch derivative. Indeed, without wishing to be bound by theory, it is believed that the presence of oxidized groups within the starch and/or starch derivative will encourage interaction and bonding of certain stabilising agents. As such, it may be desirable, in certain embodiments, to perform an oxidisation step prior to introduction of the stabilising agent. After oxidation, the composition of starch and/or starch derivative together, optionally, with the stabilising agent and initiator, will advantageously have a carboxylic content of up to 15% by weight, based on dry weight, preferably up to 10% by weight.

A skilled person will be able to determine the appropriate amount of initiator required depending on the desired end result and the nature of the other reagents. According to certain embodiments, initiator may be used in an amount of up to 4% by weight, based on the total dry weight of starch and/or starch derivatives. For example, 1 to 2% by weight initiator may be used.

After mixing the starch and/or starch derivative with the stabilising agent and, optionally, the initiator, conditions within the reaction medium may be optimised. Preferably, the reaction is initiated by a heat treatment. Advantageously, this heat treatment may also be used to gelatinize the starch.

Neutralising

After stabilisation, the starch and/or starch derivative is functionalised. However, before this can happen, the reaction medium must first be neutralised. Preferably, the pH of the reaction medium will be adjusted to a pH in the range of 6-8, preferably of 6-7. pH adjustments can be achieved using any means known in the art (e.g. by titration with a caustic such as sodium hydroxide, potassium hydroxide, lithium hydroxide, ammonium hydroxide, sodium carbonate, calcium hydroxide and the like). The reaction medium may also be cooled, e.g. by allowing it to return to room temperature (i.e. about 20-25° C.). One or more additional ingredients may be added to and/or reacted with the resulting composition. These additional ingredients will be selected depending on the final application and desired functionality of the starch-based composition—and the step of adding them to and/or reacting them with the starch and/or starch derivative will therefore be referred to herein as the funtionalisation step.

Functionalisation

Preferably, functionalisation will include adding a wet-strength agent and/or a plasticiser to the reaction medium. Suitable wet strength agents will be know to—and easily selected by—the person skilled in the art and may include, for example, reactive polymers, such as poly-cationic polymers, inorganic compounds, functional monomers and mixtures of two or more thereof. Preferred wet strength agents include PAAE (polyaminoamine-epichlorohydrin), PAAE resins, modified vegetable oils, oil emulsions, ammonium, AZC (ammonium zirconium carbonate), PZC (potassium zirconium carbonate), glyoxal, glyoxal-based resins and mixtures of two or more thereof. Wet strength agents will advantageously be added to the reaction medium in an amount of between 0.2 and 5% by weight, more specifically between 1 and 2% by weight, based on total dry weight of the composition. Plasticisers, and specifically starch plasticisers, are well known to those skilled in the art. A suitable example of a starch plasticiser for use in accordance with the present invention is glycerol. It can be used to fine-tune the rheological properties of the starch-based composition and to improve reactivity e.g. with wet strength agents such as modified oils. It may also be used to adjust dry solid content of the starch-based composition.

Starch-Based Compositions

Compositions obtainable according to the above process are also part of the present invention. Preferably, they will have a dry solid content of at least 40% by weight, preferably of between 40 and 70% by weight. They will also ideally have a pH in the range of 5 to 9, preferably in the range of 6.5 to 8. They will advantageously have a Brookfield viscosity from 50-600 mPas (100 rpm, 25° C., spindle 3). In fact, one of the benefits of the compositions of the present invention is that they have been found to have a stable viscosity: tests have shown visco-stability over a period of at least 3 months. What's more, they do not show a rapid increase in viscosity during cooling to temperatures of about 20° C.

Advantageously, it has been found that, when mixed with latexes, the compositions of the present invention do not have a detrimental effect on the mechanical properties of the latex. This is particularly interesting as one of the key applications of the starch-based compositions of the present invention is for the production of hybrid binder compositions with latex.

Latex Replacement and Binder Compositions

The starch-based composition of the present invention may be used as a binder to replace natural and/or synthetic latex (such as carboxylated styrene butadiene, acrylate, PVAC or PVOH), either in part or in whole. In fact, the starch-based compositions of the present invention have been found to be readily miscible with latex, forming so called "hybrid latexes" or "hybrid binder compositions". When used together, the starch-based compositions of the invention and the natural or synthetic latex may be mixed in a weight ratio between 1:10 and 10:1, preferably between 1:4 and 4:1, more preferably between 2:3 and 3:2, more preferably approximately 1:1. By way of example, the starch-based composition may be used to replace 40-50% of the latex by weight. Alternatively, it may be used to replace 60-70% of the latex by weight. The resulting hybrid binder compositions are also part of the present invention. They may include one or more additional ingredients and can be used for any application where natural or synthetic latex is normally used. Examples of such applications include, by way of illustration only, carpet-backing (and backing of other woven or non-woven materials), sizing and coating compositions (e.g. for paper, textiles and non-wovens), paper converting and adhesive formulations. The binder compositions of the invention can also be used in applications where foamed latex would normally be used.

The hybrid binder compositions of the present invention will preferably be produced by a process comprising mixing the starch-based composition of the invention with natural and/or synthetic latex and one or more optional ingredients. The one or more optional ingredients, if used, will correspond to standard additives used in the art (e.g. additives used with latex such as stabilisers or anti-foaming agents) and will readily be determined by a skilled person. The hybrid binder may then be stored or used. It may be used as such or it may be mixed with one or more further ingredients to produce a final composition (e.g. a coating composition or an adhesive). After application to a substrate, the composition will preferably be cured (i.e. dried, preferably in a heated dryer). Without wishing to be bound by theory, it is believed that the curing step promotes copolymerization of the starch and/or starch derivatives of the starch-based composition with the latex.

Advantageously, when using the starch-based composition of the present invention, a reduction in volatile organic compound (VOC) emissions is observed. Indeed, the starch-based composition of the invention has a VOC content which is very low, if not zero. A low VOC content is desirable from health and environmental perspectives, but is also becoming a requirement to meet higher scores in sustainability assessments like the US LEED rating system. It has been found that optimum binder properties can be achieved with the hybrid binder compositions of the present invention which exhibit a desirably low VOC-content without compromising on the layer forming properties of latex. In fact, it has surprisingly been found that the replacement of latex with the starch-based composition of the invention leads to a reduction in VOC emissions far greater than would be expected based on the actual level of latex replacement.

As mentioned above, the starch-based compositions of the present invention—and binder composition produced therewith—can be used in any number of applications to replace (fully or partially) latex. Without introducing any limitations, we will now illustrate one such application.

Carpet Backing

As a final step in manufacturing, carpet is typically fed through a latex applicator to apply air foamed SBR latex filled with powdered calcium carbonate to the non-pile side (back) of the primary backing and "back-tufts" of yarn. This is done by applying a so-called pre-coat to the primary backing, adhering the loop piled yarn to the primary backing, then applying a second air foamed latex amount to form a second layer giving dimension stability and flexibility to the carpet. Finally the secondary backing is applied to the carpet in the merge to form the generic "sandwich" composite construction. The carpet then proceeds through several heating zones to cure the latex and insure the binding of the secondary backing to the primary backing and the "lock-in" of the back-tufts of yarn. Once the carpet has been cured, it is inspected for colour and construction quality assurance, cut to the desired length, rolled, packaged and shipped.

In addition to latex and filler, the backing composition may also comprise water (which is used to adjust solid content, aid filler dispersion and extend shelf life). The filler is almost always calcium carbonate due to its universal availability and economical price. Its grind and purity are critical for stability and runability of the binder composition. Typical pre-coat loadings are between 400 and 600 parts per 100 parts dry latex. Surfactants may be used to increase stability and frothability of the composition. Sodium lauryl sulfate (SLS) and ammonium lauryl sulfate (ALS), sodium sulfosuccinamate, and combinations of ALS and long chain alcohols are commonly used as suitable surfactants. Thickeners may also be used and are almost always sodium polyacrylates. They impart the proper viscosity and rheology to allow proper placement of the composition. They also help to suspend the filler in the composition. Other ingredients may also occasionally be used for example if the backing composition needs a specific appearance or specialized performance property. Additional ingredients may include pigments, defoamers, dispersants, chelating agents, anti-blistering agents, anti-static agents, stabilizers and so on.

Advantageously, the starch-based composition of the present invention can be used to replace latex, in full or in part (as described above), in such carpet backing compositions. Thus, the present invention also provides a carpet backing composition comprising a starch-based composition or binder composition as defined above, and carpet products produced therewith. The carpet backing composition of the invention will typically further comprise one or more fillers and one or more surfactants, together with one or more optional ingredients in line with standard practice in the industry. Surprisingly, it has been found that the carpet backing composition of the present invention need not include thickeners in the amounts typically required for latex-only based backings. In fact, in certain embodiments, thickeners may be omitted altogether, with a beneficial effect on the whole cost of the composition.

The performance of the backing composition may be further optimized by adjusting certain parameters well known to the skilled person. Such parameters include the percentage of dry solid matter, viscosity, pH, the type of latex used, if any (including the ratio of styrene and butadiene in styrene butadiene synthetic latexes), the type and amount of surfactant used and so on. The amount of filler may also be adjusted depending on the type of backing composition being produced. For example, a unitary backing will preferably comprise 150-200 parts of filler per 100 parts binder (based on dry weight) whereas a secondary backing will preferably comprise 0-450 parts filler per hundred parts binder.

The present invention will now be further described by way of the following non-limiting examples.

EXAMPLES

Example 1

Preparation of a Starch-Based Composition of the Invention in Open Batch System

Dextrin (a starch derivative), itaconic acid and persulfate are mixed together in an aqueous composition. The dextrin is present in an amount of 35-45% by weight based on the total weight of the composition. The itaconic acid is present in an amount of 5% by weight based on the total dry weight of dextrin. The pH of the composition is approximately 1.7. After 60 minutes mixing at 100 rpm the composition is heated to 80° C. for 3 to 5 hours before being cooled to 30° C. The heating results in cooking of the dextrin, simultaneously with polymerisation of the itaconic acid and modifying the dextrin. After cooling to 30° C., the composition is neutralized to pH 6-7 with sodium hydroxide. To the resulting composition is added 1.5% PAE (polyaminoamine-epichlorohydrin, as a wet-strength agent), and optionally glycerine and native starch. The result is a starch-based composition, with a dry solid content adjustable from 45 to 70% by weight dry substance.

Example 2

Preparation of a Starch-Based Composition of the Composition by Use of Jet Cooker Dextrin, itaconic acid and persulfate are mixed together in an aqueous composition. The dextrin is present in an amount of 35-45% by weight based on the total weight of the composition. The itaconic acid is present in an amount of 5% based on the total dry weight of dextrin. The pH of the composition is approximately 1.7. After 15 minutes mixing at 100 rpm the composition is jet-cooked at 140° C. for 2 minutes and the paste maintained at 92-94° C. for 1 hour in a closed tank. The heating results in cooking and full dispersion of the dextrin, simultaneously with polymerisation of the itaconic acid and of modification of the dextrin. After cooling to 30° C., the composition is neutralized to pH 6-7 with sodium hydroxide. To the resulting composition is added 1.5% PAE (polyaminoamine-epichlorohydrin, as a wet-strength agent), and optionally glycerine and native starch. The result is a starch-based composition, with a dry solid content adjustable from 45 to 70% by weight dry substance.

Example 3

Preparation of a Starch-Based Composition of the Invention by Enzymatic Conversion Dextrin is suspended in water in an amount of 35-45% by weight. The resulting slurry is heated up to 80° C. and then an alpha-amylase (BAN 480L, Novozymes) is added to the suspension. The alpha-amylase is added in an amount of 500 ppm, based on the dextrin. After 30 minutes at 80° C. itaconic acid and persulfate are added to the aqueous composition. The itaconic acid is present in an amount of 5% by weight based on the total dry weight of dextrin. The pH of the composition is approximately 1.7. After 30 minutes mixing at 100 rpm, the composition is cooled to 30° C. The heating results in cooking of the starch by enzymatic conversion, simultaneously with polymerisation of the itaconic acid and modification of the dextrin. Additionally the acid inactivates the enzyme. After cooling to 30° C., the composition is neutralized to pH 6-7 with sodium hydroxide.

To the resulting composition is added 1.5% PAE (polyaminoamine-epichlorohydrin, as a wet-strength agent), and optionally glycerine and native starch. The result is a starch-based composition with a dry solid content adjustable from 45 to 70% dry substance.

Example 4

Preparation of a Starch-Based Composition of the Invention from Maltodextrin

Maltodextrin (a starch derivative), itaconic acid and persulfate are mixed together in an aqueous composition. The maltodextrin is present in an amount of 35-45% by weight based on the total weight of the composition. The itaconic acid is present in an amount of 5% by weight based on the total dry weight of maltodextrin. The pH of the composition is approximately 1.7. After 15 minutes mixing at 100 rpm, the composition is neutralized to pH 6-7 with sodium hydroxide. To the resulting composition is added 1.5% PAE (polyaminoamine-epichlorohydrin, as a wet-strength agent), and optionally glycerine and native starch. The result is a starch-based composition with a dry solid content adjustable from 45 to 70% dry substance.

FIG. 1 indicates the viscosity development of four samples prepared in accordance with each of Examples 1 to 4 and having, respectively, Sample 1 (from Ex. 1)=50% ds; Sample 2 (from Ex. 2)=49% ds; Sample 3 (from Ex. 3)=52% ds; and Sample 4 (from Ex. 4)=50% ds. Remarkably, the viscosity remains stable for 5 weeks. Being a composition of natural origin, it may be necessary to add a certain amount of preservative to avoid the product spoiling due to fermentation if longer periods of storage are required.

Example 5

Preparation of Carpet Backing Compositions of the Invention

The starch-based composition as prepared in accordance with Example 2 is mixed, in different proportions, with synthetic latexes to obtain "hybrid latexes" or hybrid binder compositions. Use is made of Dow Latex 552 (hard latex) and Dow Latex 700 (soft latex), that were obtained commercially. Further ingredients were then added to form a pre-coat carpet backing composition, as listed in Table 1 (where Composition 1 is a reference composition).

TABLE 1

Pre-coat compositions (ingredients based on commercial weight)

| Ingredients (in parts by weight) | Composition 1 | Composition 2 | Composition 3 | Composition 4 |
|---|---|---|---|---|
| Replacement of latex | 0% | 20% | 20% | 40% |
| Dow Latex 552 | 280 | 210 | 210 | 150 |
| Dow Latex 700 | 30 | 30 | 30 | 30 |
| Starch-based composition | 0 | 60 | 60 | 130 |
| Water | 100 | 100 | 100 | 100 |
| Calcium carbonate | 1370 | 1370 | 1370 | 1370 |
| Soap | 7 | 7 | 7 | 7 |
| Dispersing agent | 2 | 2 | 2 | 2 |
| Thickener (polyacrylate) | 7 | 6 | 4.5 | 3 |

Example 6

Use of Backing Compositions of Example 5 as a Primary Backings

The compositions prepared in accordance with Example 5 were applied as a primary backing for tufted carpet, with an add-on of 1-1.4 Kg/sqm. Table 2 shows measurement results.

TABLE 2

Pre-coat add-on and tuft withdrawal

| | Composition 1 | Composition 2 | Composition 3 | Composition 4 |
|---|---|---|---|---|
| Dry solids content (%) | 79.6 | 79.6 | 79.7 | 79.6 |
| pH | 8.7 | 8.5 | 8.3 | 8.6 |

TABLE 2-continued

Pre-coat add-on and tuft withdrawal

|  | Composition 1 | Composition 2 | Composition 3 | Composition 4 |
|---|---|---|---|---|
| Viscosity ($10^3$ mPas) at 20 rpm SP4 | 4.0 | 5.5 | 4.0 | 4.0 |
| Viscosity after 24 hours stirring at 20 rpm SP4 ($10^3$ mPas) | 7.8 | 8.0 | 7.1 | 8.7 |
| Tufted felt (kg/m$^2$) | 2.0 | 1.7 | 2.1 | 2.0 |
| Filler (kg/m$^2$) | 1.25 | 1.0 | 1.4 | 1.3 |
| Average tuft withdrawal (N/string) | 57.2 | 27.8 | 48.4 | 35.2 |

Compositions 2 to 4 (compositions of the invention) were compared to Composition 1 (which does not contain a starch-based composition of the invention). As shown in Table 2, the dry solids contents of the compositions were all the same, and the variation of the pH was marginal. Viscosity measurements are done with a Brookfield Viscometer, Model DV II+ at 20 rpm with a no. 4 spindle.

The viscosity increase in the first 24 hours was comparable for all compositions. The suitability for use in carpet backing was assessed by checking the densities of tufted felt and filler. In this respect, Compositions 3 and 4 in particular showed results that were highly comparable with those of the Reference. Tuft withdrawal is a measurement of the strength of a carpet material, assessed according to the ISO method 4919. The minimum accepted level of this parameter is 20 (N/string) for the specific tested material (class 4 flour covering). For other materials (i.e. class 1 to 3 floor coverings) a suitable level is anything above 15 (N/string). Though some strength is lost in comparison to the reference, the compositions of the invention all easily meet the minimum level. Hence, it was concluded that the properties of the starch-based composition of the invention were good enough to replace synthetic latex.

Example 7

Preparation of Carpet Backing Compositions of the Invention

The starch-based composition as prepared in accordance with Example 4 is mixed, in different proportions, with Synthomer 91Y90 to obtain "hybrid latexes" or hybrid binder compositions. Further ingredients were then added to form a pre-coat carpet backing composition, as listed in Table 3 (where Composition 1 is a reference composition).

TABLE 3

Pre-coat compositions (ingredients based on commercial weight)

| Ingredients (in parts by weight) | Composition 1 | Composition 2 | Composition 3 | Composition 4 |
|---|---|---|---|---|
| Replacement of latex | 0% | 15% | 25% | 40% |
| Synthomer 91Y90 | 200 | 170 | 150 | 120 |
| Starch-based composition | 0 | 30 | 50 | 80 |
| Water | 40 | 40 | 40 | 40 |
| Calcium carbonate | 400 | 400 | 400 | 400 |
| Soap | 0.72 | 1.4 | 1.8 | 1.8 |

Example 8

Use of Backing Compositions of Example 7 as a Primary Backings

The compositions prepared in Example 7 were applied as a primary backing for tufted carpet, with an average precoat content 550 g/m$^2$. Measurements are shown in Table 4.

TABLE 4

Pre-coat add-ons, tuft withdrawal measurements and Lisson testings

|  | Composition 1 | Composition 2 | Composition 3 | Composition 4 |
|---|---|---|---|---|
| Viscosity (cp) at 100 rpm SP2 | 290 | 218 | 210 | 222 |
| Precoat (g/m2) | 575 | 573 | 533 | 523 |
| Average tuft withdrawal (N/string) | 29.8 | 27.7 | 20.2 | 15.5 |
| Tufting (Lisson 400t-1) | NOK− | OK++ | OK+ | OK+ |

Compositions 2 to 4 (compositions of the invention) were compared to Composition 1 (which does not contain a starch-based composition of the invention). In terms of tuft withdrawal, although some strength is lost with Compositions 2-4 in comparison to the Composition 1, the hybrid latexes of the invention all easily meet the minimum level of 15 for Class 1 to 3 floor coverings. Compositions, 2 and 3 even meet the minimum level of 20 for Class 4 floor coverings. Hence, it was concluded that the properties of the starch-based composition of the invention were good enough to replace synthetic latex.

Tufting is evaluated according EN1963 Method C (Lisson-400 t). In short, a visual inspection defines if the carpet resists to a certain level of cycle. Based on this, Compositions 2-4 perform remarkably well and pass the test.

Example 9

Visco Stability of the Hybrid Latexes of the Invention

Hybrid latexes produced with synthetic latex (Synthome 91Y90) and the starch-based compositions of Example 4 (at 50% ds) were tested for visco-stability over time. Hybrids were produced with different levels of latex replacement, as shown in Table 5. The results clearly show that the viscosity is stable over a period of more than one month. After such a period, the hybrid latexes of the invention could therefore still be used e.g. for producing carpet backing compositions, as if they were freshly prepared. This outcome is very important because it demonstrates that, once the starch-based composition is mixed with standard latexes, the final binder, here called hybrid latex, is stable and it can be used as and when needed.

TABLE 5

Visco stability of hybrid latexes (viscosity measured in cp at 100 rpm)

|  | Day 0 | 6 Weeks |
|---|---|---|
| 100% latex | 198 | 200 |
| 15% replacement with starch-based composition | 84 | 73 |
| 25% replacement with starch-based composition | 73 | 64 |
| 40% replacement with starch-based composition | 73 | 70 |
| 50% replacement with starch-based composition | 75 | 73 |

Examples 10

Ageing Test of Pre-Coated Carpet

Ageing tests were done in order to confirm the long-term performance of the starch-based compositions of the invention. In this respect, tuft loop pile carpets pre-coated with Compositions 1 and 2 of Example 5, were put in an oven at 120° C. for 10 days. After this residence time tuft withdrawal strength was measured according the ISO method 4919. The results are shown in Table 6.

TABLE 6

Tuft withdrawal after ageing

|  | Before ageing (N) | After ageing (N) |
|---|---|---|
| Reference (C1) | 57 | 64 |
| Composition 2 | 59.8 | 57 |

As can be seen, even after ageing, performance of backing compositions produced in accordance with the present invention has not deteriorated.

Example 10

VOC Reduction

Variation in VOC emissions was tested with a 100% latex composition and a hybrid binder produced with 20% of a starch-based composition of the invention as produced in Example 2 (at 50% ds), both in the form of aqueous compositions. One drop of the compositions is heated in a glass tube at 50° C. during 15 seconds under an inert gas flow. The gas flow is lead over a tenax filled tube where VOCs are trapped. The tenax tube is run on a Markes thermal desorber coupled to a thermo DSQ mass spectrometer. As a reference, an internal standard d8 toluene is used. As shown in Table 7, VOC emissions are reduced by the use starch-based compositions of the invention by a much higher factor than the weight-to-weight replacement level would suggest (i.e. by far more than 20% in this case). Therefore, it seems that the starch-based compositions of the invention also act as a VOC scavengers.

TABLE 7

VOC emissions

|  | Ethyl-benzen | Cyclo-hexanol | Sty-rene | Benz-aldehyde | Phenoxy-ethanol | 4-PCH |
|---|---|---|---|---|---|---|
| Reference Latex | 0.683 | 2.962 | 0.441 | 0.649 | 0.250 | 0.540 |

TABLE 7-continued

VOC emissions

|  | Ethyl-benzen | Cyclo-hexanol | Sty-rene | Benz-aldehyde | Phenoxy-ethanol | 4-PCH |
|---|---|---|---|---|---|---|
| 20% starch-based composition | 0.091 | 1.382 | 0.160 | 0.281 | 0.053 | 0.346 |
| Variation (%) | 87 | 53 | 64 | 57 | 79 | 46 |

The invention claimed is:

1. A process for the production of a starch-based composition, the process comprising:
    a) providing a starch product, wherein the starch product is a cold water soluble starch product;
    b) reacting the starch product with a cross-linking agent selected from one or more dicarboxylic acids, wherein the cross-linking agent is used in an amount of 0.5 to 10% by weight based on the total dry weight of the starch product;
    c) adjusting the pH of the cross-linked starch product to a pH in the range of 6 to 8; and
    d) functionalizing the starch product obtained in step (c) by adding a wet-strength agent and/or a plasticizer to the reaction medium.

2. The process of claim 1, wherein the starch product is selected from the group consisting of starch, starch derivatives, and mixtures thereof.

3. The process of claim 1, wherein the cross-linking agent is itaconic acid.

4. The process of claim 1, wherein step (b) further comprises reacting the starch product with an initiator.

5. The process of claim 4, wherein the initiator is a persulfate.

6. The process of claim 1, further comprising thinning the starch product prior to step (c).

7. The starch-based composition obtained by the process of claim 1.

8. A binder composition comprising:
    the composition of claim 7; and,
    latex.

9. A carpet backing composition comprising the composition of claim 7.

10. A process for the production of a starch-based composition, the process comprising:
    a) providing a starch product;
    b) treating the starch product to increase its cold water solubility;
    c) reacting the starch product with a cross-linking agent selected from one or mom dicarboxylic aids and wherein the cross-linking agent is used in an amount of 0.5 to 10% by weight based on the total dry weight of the starch product;
    d) adjusting the pH of the cross-linked starch product to a pH in the range of 6 to 8; and
    e) functionalizing the starch product obtained in step (d) by adding a wet-strength agent and/or a plasticizer to the reaction medium.

11. The process of claim 10, wherein the starch product is selected from the group consisting of starch, starch derivatives, and mixtures thereof.

12. The process of claim 10, wherein the cross-linking agent is itaconic acid.

13. The process of claim 10, wherein step (c) further comprises reacting the starch product with an initiator.

14. The process of claim 13, wherein the initiator is a persulfate.

15. The process of claim 10, further comprising thinning the starch product prior to step (d).

16. The starch-based composition obtained by the process of claim 10.

17. A binder composition comprising:
the composition of claim 16; and,
latex.

18. A carpet backing composition comprising the composition of claim 16.

* * * * *